US008838699B2

(12) United States Patent
Barlow

(10) Patent No.: US 8,838,699 B2
(45) Date of Patent: Sep. 16, 2014

(54) POLICY BASED PROVISIONING OF WEB CONFERENCES

(75) Inventor: William C. Barlow, Newburyport, MA (US)

(73) Assignee: International Business Machines Corporation, Armonk, NY (US)

( * ) Notice: Subject to any disclaimer, the term of this patent is extended or adjusted under 35 U.S.C. 154(b) by 1896 days.

(21) Appl. No.: 10/788,860

(22) Filed: Feb. 27, 2004

(65) Prior Publication Data

US 2005/0193129 A1   Sep. 1, 2005

(51) Int. Cl.
*G06F 15/16* (2006.01)
*H04L 29/06* (2006.01)
*H04L 12/18* (2006.01)

(52) U.S. Cl.
CPC ...... *H04L 29/06027* (2013.01); *H04L 65/4038* (2013.01); *H04L 12/1818* (2013.01)
USPC .......................................... 709/206; 709/203

(58) Field of Classification Search
USPC ........................................................ 709/204
See application file for complete search history.

(56) References Cited

U.S. PATENT DOCUMENTS

| 5,347,306 | A | * | 9/1994 | Nitta | 348/14.1 |
|---|---|---|---|---|---|
| 5,594,859 | A | * | 1/1997 | Palmer et al. | 715/756 |
| 5,611,050 | A | * | 3/1997 | Theimer et al. | 709/202 |
| 5,664,126 | A | * | 9/1997 | Hirakawa et al. | 715/751 |
| 5,745,711 | A | * | 4/1998 | Kitahara et al. | 715/759 |
| 5,799,191 | A | * | 8/1998 | Moriyasu et al. | 709/204 |
| 5,907,324 | A | * | 5/1999 | Larson et al. | 715/753 |
| 6,301,609 | B1 | * | 10/2001 | Aravamudan et al. | 709/207 |
| 6,415,318 | B1 | * | 7/2002 | Aggarwal et al. | 709/206 |
| 6,437,818 | B1 | * | 8/2002 | Ludwig et al. | 348/14.09 |
| 6,438,594 | B1 | * | 8/2002 | Bowman-Amuah | 709/225 |
| 6,564,261 | B1 | * | 5/2003 | Gudjonsson et al. | 709/227 |
| 6,671,724 | B1 | * | 12/2003 | Pandya et al. | 709/226 |
| 6,804,816 | B1 | * | 10/2004 | Liu et al. | 719/311 |
| 6,816,904 | B1 | * | 11/2004 | Ludwig et al. | 709/226 |
| 7,035,899 | B2 | * | 4/2006 | Marchon et al. | 709/204 |
| 7,068,680 | B1 | * | 6/2006 | Kaltenmark et al. | 370/469 |
| 7,133,512 | B2 | * | 11/2006 | Creamer et al. | 379/202.01 |
| 7,290,288 | B2 | * | 10/2007 | Gregg et al. | 726/28 |
| 7,421,469 | B1 | * | 9/2008 | Liu et al. | 709/204 |
| 7,814,150 | B1 | * | 10/2010 | Sonnenfeldt et al. | 709/204 |
| 8,503,639 | B2 | * | 8/2013 | Reding et al. | 379/164 |
| 8,503,650 | B2 | * | 8/2013 | Reding et al. | 379/202.01 |
| 2003/0120593 | A1 | * | 6/2003 | Bansal et al. | 705/39 |
| 2003/0172145 | A1 | * | 9/2003 | Nguyen | 709/223 |
| 2004/0199580 | A1 | * | 10/2004 | Zhakov et al. | 709/204 |
| 2005/0021620 | A1 | * | 1/2005 | Simon et al. | 709/204 |
| 2005/0034079 | A1 | * | 2/2005 | Gunasekar et al. | 715/753 |
| 2005/0097440 | A1 | * | 5/2005 | Lusk et al. | 715/500.1 |
| 2011/0055385 | A1 | * | 3/2011 | Tung et al. | 709/224 |

* cited by examiner

*Primary Examiner* — Ninos Donabed
(74) *Attorney, Agent, or Firm* — Steven M. Greenberg, Esq.; CRGO Law

(57) ABSTRACT

A method, system and apparatus for the policy driven provisioning of a Web conference. A Web conference provisioning system can include a policy manager coupled to at least two different Web conferencing platforms over a computer communications network. The policy manager can have a configuration for processing a request for a Web conferencing from a communicatively linked end user to select one of the Web conferencing platforms to host the Web conference. Preferably, two of the different Web conferencing platforms can include a CPE based platform and a hosted platform.

13 Claims, 2 Drawing Sheets

POLICY BASED PROVISIONING OF WEB CONFERENCES

BACKGROUND OF THE INVENTION

1. Statement of the Technical Field

The present invention relates to Web conferencing and more particularly to managing Web conference provisioning.

2. Description of the Related Art

The rapid development of the Internet has led to advanced modes of communication and collaboration. Using the Internet as a backbone, individuals worldwide can converge in cyberspace to share ideas, documents and images in a manner not previously possible through conventional telephony and video conferencing. To facilitate collaboration over the Internet, a substantial collection of technologies and protocols have been assembled to effectively deliver audio, video and data over the single data communications medium of the Internet. Nevertheless, the real-time delivery requirements of audio and video have strained the infrastructure of the Internet in its ability to support multimedia collaboration.

The strained nature of the Internet infrastructure has given rise to two different, competing delivery methods for Web conferencing. In a first delivery method, customer premise equipment (CPE) supports the entirety of a Web conference. In particular, the Web conferencing servers and the network infrastructure itself are hosted with the confines of a private network environment managed by the end user using mostly privately owned technology (hence, the term "CPE"). In a second, competing delivery method, the technology and infrastructure which supports Web conferencing can be outsourced to a host environment. In this hosted solution, the technology and infrastructure supporting Web conferences is managed by a third party and the supporting equipment further can be positioned off-site.

It is a distinct advantage of the hosted Web conferencing solution that economies of scale can permit the use of expensive, media delivery technologies not available for the typical, individual customer. In this regard, the underlying technology supporting Web conferences in a hosted solution can be disposed in a data center where network bandwidth is significantly wider than that of the terminal points of the customer data communications network. Hosted solutions also generally provide for enhanced scalability, usually for a fee, of course. Finally, communicative interoperability can be achieved with relative ease in the hosted solution in as much as the entire Web conferencing infrastructure remains outside of private firewalls for each respective collaborator.

Still, hosted solutions tend to be expensive and application interoperability can be difficult to achieve. Moreover, in that the hosted solution lies outside of the zone of the private firewall, security can be of a concern for Web conferences of a sensitive nature. The lesser expensive CPE based Web conferencing can provide for a level of security not provided by the hosted Web conferencing solution because the technology supporting the Web conferences typically remains inside the private network behind a firewall. Moreover, application interoperability can be better achieved because the CPE based Web conferencing solution can be a private, and singly minded solution designed to address the needs of particular users rather than a wide range of users.

Nevertheless, CPE based Web conferencing has given rise to significant communications interoperability problems—particularly where it is desirable to conference collaborators both from within the private data communications network, and also from outside the private data communications network. Scaling further can be difficult and the resources of the private customer can be taxed accordingly in order to scale Web conferencing capabilities to support larger, and more complex conferencing arrangements. Finally, unlike hosted solutions, audio integration can be difficult to setup and manage in the CPE based solution.

It will be recognized by the skilled artisan that both CPE based solutions and hosted solutions to Web conferencing can be appropriate only in particular circumstances. Where a Web conference involves only a handful of collaborators in a small workgroup behind the corporate firewall, a CPE based solution can be appropriate. Larger Web conferences incorporating collaborators both from behind and on the outside of the corporate firewall can demand a more sophisticated (and costly) hosted solution. Notwithstanding, the Web conferencing requirements of a customer can vary with time and circumstance. Moreover, complex situations can make it difficult for a customer to aptly select an appropriate approach.

Presently, the customer must manually select an approach in advance of scheduling a conference so that the customer can make private arrangements either internally or externally with the Web conference host. In many cases, the customer site can be pre-configured either for CPE based conferencing or hosted conferencing. To that extent that both CPE and hosted solutions may be available, the customer can manually select on approach, occasionally with the assistance of printed instructions advising the customer on which solution to select based upon a limited set of conferencing criteria. Just the same, it is not uncommon that there are no standards or "advisory documents" within a site which specify a methodology for selecting a Web conference host. In those circumstances, individual users acquire Web conferencing from internal or external sources as they see fit. Consequently, the organization exercises no control over the selection process and therefore no control over the costs of Web conferencing.

Nevertheless, the criteria can change with time and complex combinations of criteria can further complicate the selection process. To expect individual collaborators to read an advisory document each time the collaborator is to establish a conference can be unrealistic which can further complicate matters when the advisory document changes over time. In this respect, present systems and methodologies for establishing a Web conference using an appropriate conferencing technology seem deficient. A more effective and seamless process would be desirable.

SUMMARY OF THE INVENTION

The present invention addresses the deficiencies of the art in respect to provisioning Web conferences and provides a novel and non-obvious method, system and apparatus for the policy driven provisioning of a Web conference. In accordance with the present invention, a Web conference provisioning system can include a policy manager coupled to at least two different Web conferencing platforms over a computer communications network. The policy manager can have a configuration for processing a request for a Web conferencing from a communicatively linked end user to select one of the Web conferencing platforms to host the Web conference. Preferably, two of the different Web conferencing platforms can include a CPE based platform and a hosted platform.

The system can include at least one policy configured for processing in the policy manager. The policy can specify a platform selection based upon Web conference criteria. The criteria can include a number of participants to the Web conference, whether the participants are internal or external to a private network of the end user, a set of features desired for use in the Web conference, a security level required for the Web conference, and a priority of the Web conference. Also, the set of features can include screen sharing, slideshow presentations, streaming audio, voice over IP, audio conferencing, the use of on-premise audio equipment, audio recording, joint Web browsing, chat and instant messaging and streaming video.

A Web conference provisioning method also can be provided in accordance with the present invention. The method can include the steps of establishing criteria for a proposed Web conference; and, applying at least one policy to the criteria to identify a platform for hosting the proposed Web conference. The method further can include the steps of resolving an address to the identified platform, imbedding the address in an invitation to participate in the proposed Web conference, and forwarding the invitation to selected participants in the proposed Web conference.

In a preferred embodiment of the present invention, once established, the criteria can be subsequently re-established. As such, the policy or policies can be applied to the re-established criteria to identify a different platform for hosting the proposed Web conference. In any event, the establishing and applying steps can be performed responsive to a request to schedule the proposed Web conference. Alternatively, the establishing and applying steps can be performed when activating the proposed Web conference.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a system, method and apparatus for the policy based provisioning of a Web conference. In accordance with the present invention, one or more conferencing policies can be established which describe when to provision a CPE implemented Web conference and when to provision a hosted Web conference based upon conferencing criteria. The conferencing criteria can include considerations such as the number of participants, the location of the participants, the level of required security, the date and time of day of the conference, and the capacity of the CPE servers at a particular time of day or date. Prior to provisioning a Web conference, the policy or policies can be applied to a set of criteria associated with the Web conference to select either a CPE implemented Web conference or a hosted Web conference.

Figure 1:
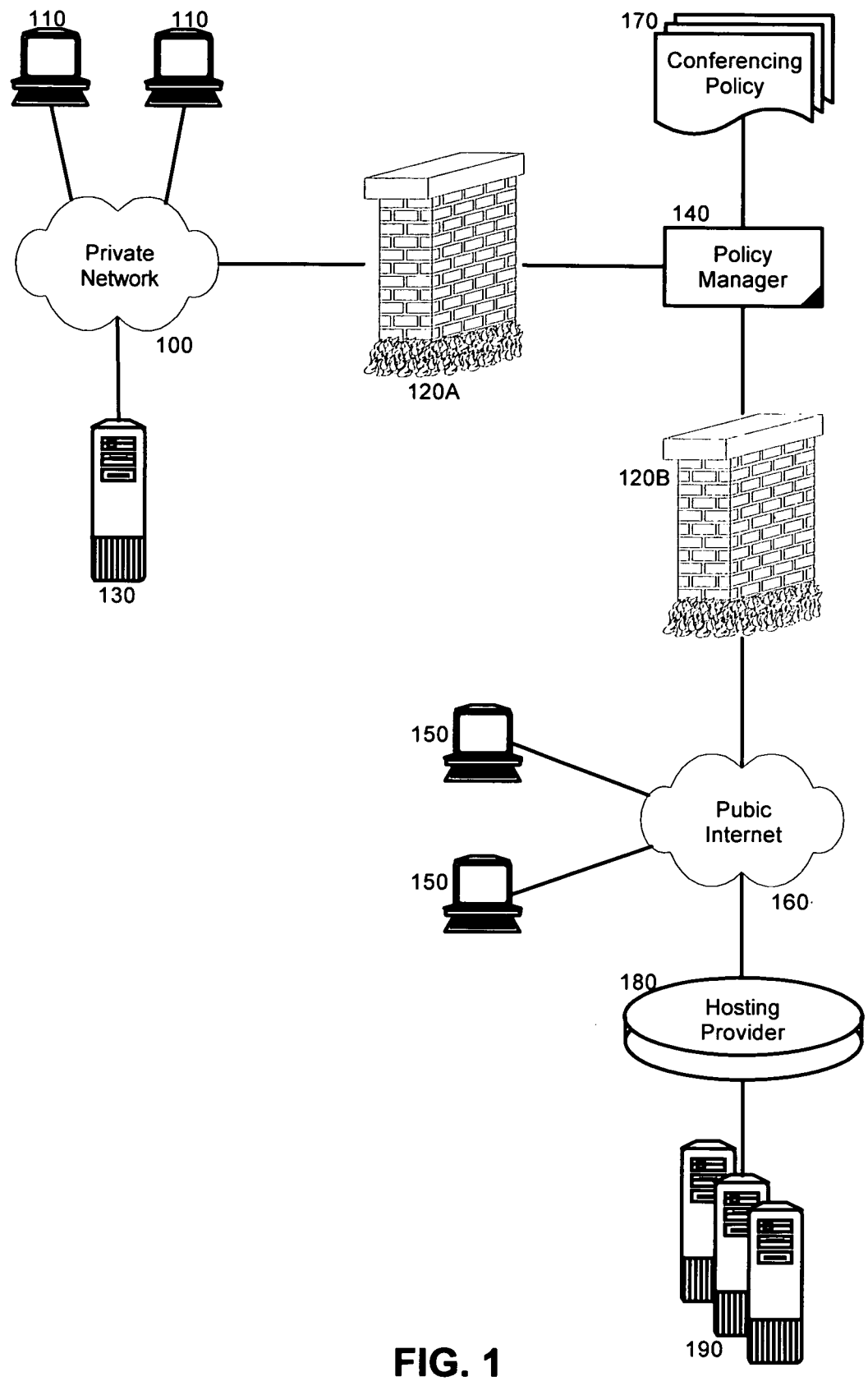
FIG. 1 is a schematic illustration of a system for policy based provisioning of a Web conference; and, FIG. 2 is a flow chart illustrating a process for provisioning a Web conference in the system of FIG. 1.

In further illustration FIG. 1 depicts a system for policy based provisioning of a Web conference. The system can include one or more internal end users 110 disposed within a private network 100 behind a private firewall 120A. A CPE based conferencing system 130 can be coupled to the internal end users 110 over the private network 100. The system further can include one or more external end users 150 disposed externally to the private network 100 and coupled to the private network 100 through the public Internet 160. A hosted conferencing system 180 having one or more backend conferencing servers 190 can also be coupled to the public Internet 160.

Importantly, a policy manager 140 can be disposed outside of the private firewall 120A, but behind a DMZ firewall 120B such that external entities like the external end users 150 can access the policy manager 140 over the public Internet 160. The policy manager 140 can process requests for Web conferences from both the internal end users 110 and the external end users 150. Specifically, the policy manager 140 can apply one or more conference policies 170 to specified conference criteria (not shown) for the requested Web conferences. Based upon the application of the conference policies 170, the policy manager 140 can assign either the CPE based conferencing system 130, or the hosted Web conferencing system 180 to handle the requested Web conference. In this regard, the policy manager 140 can perform the assignment either at the time the Web conference is scheduled, or at the time the Web conference is initiated.

Figure 2:
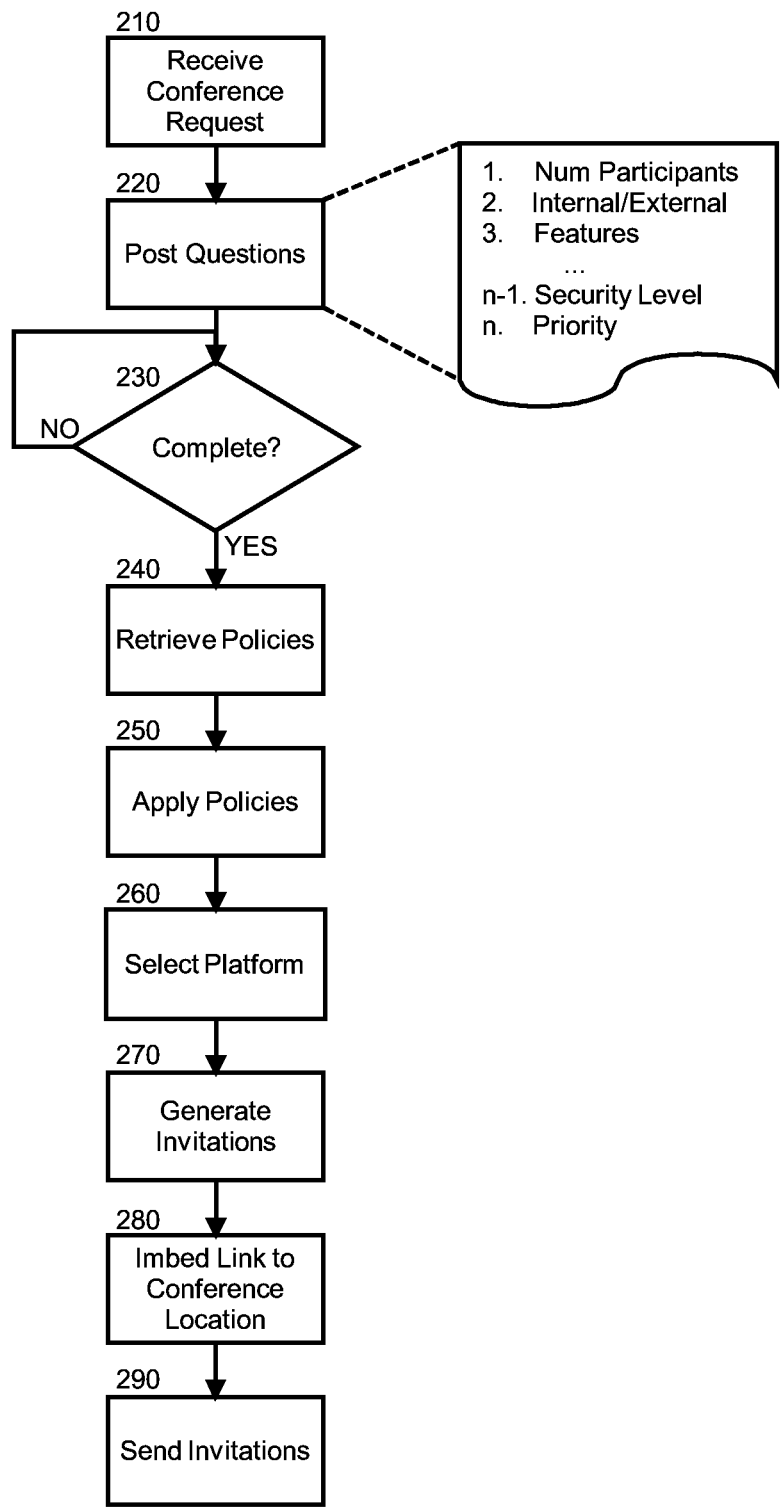

In more particular illustration, FIG. 2 is a flow chart illustrating a process for provisioning a Web conference in the system of FIG. 1. Beginning in block 210 a conference request can be received. The conference request can be initiated by an authorized end user to schedule a Web conference for a particular date and time with a particular group of participants or type of participants. In block 220, a selection of questions representing criteria for the proposed Web conference can be posed to the requesting end user. The questions can include, but are not limited to the number of participants likely to join in the Web conference, whether the participants are positioned internally within the private network, or externally about the public Internet, the desired features for the Web conference including screen sharing, slideshow presentations, streaming audio, voice over IP, audio conferencing, the use of on-premise audio equipment, audio recording, joint Web browsing, chat and instant messaging, streaming video, and the like, the desired security level for the conference and the priority of the conference.

If in decision block 230, the end user has completed answering the posed questions, in block 240 one or more policies can be retrieved for determining a suitable platform for hosting the requested Web conference. In particular, in block 250 the answers to the posed questions representing the criteria of the requested Web conference can be processed along with the retrieved policy or policies. Consequently, in block 260 a platform can be selected to host the Web conference, for instance a CPE based platform or a hosted platform.

In block 270, one or more invitations can be generated for delivery to the proposed participants in the requested Web conference. As an example, an e-mail can be generated which incorporates a hyperlink to the selected platform for the Web conference along with an identifier for the Web conference. In this regard, in block 280 a hyperlink to the Web conference can be imbedded in the invitations and in block 290, the invitations can be forwarded to the invited participants. Nevertheless, the invention is not limited in this way and in an alternative arrangement, the invitations can include a hyperlink to logic which can establish the platform to host the Web conference at the time of the Web conference.

It will be recognized by the skilled artisan that the policies for provisioning a Web conference can be applied at any point in the process of provisioning the Web conference—from the time of scheduling the Web conference to the time of activating the Web conference. In fact, the skilled artisan will further recognize that a selected platform can change once selected responsive to changing circumstances of which the policy manager becomes aware. In this way, the arrangement of the present invention provides substantial benefits over the manual selection of a Web conferencing platform known in the art.

Specifically, costs can be controlled in that a CPE based solution can be leveraged whenever possible. Moreover, meetings can be scheduled at the best time for attendees and not when capacity is available. Peak loads can be provisioned externally on a hosted solution rather than denying the meeting outright. Optimal performance and scalability can be achieved where a hosted solution is selected to accommodate a large meeting, or where a firewall can present communicative interoperability problems. Of course, a CPE based solution no longer must incorporate all possible expensive and complex conferencing features as a hosted solution can be utilized when the need arises for the additional conferencing features. Finally, internal meetings can remain secure and locked down in the CPE based solution when required.

The present invention can be realized in hardware, software, or a combination of hardware and software. For example, the data handling policy can be stored in a database. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein. For example, the data handling policy can be stored in a database.

A typical combination of hardware and software could be a general purpose computer system having a central processing unit and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computer system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

I claim:

1. A policy based Web conference provisioning system comprising:
a policy manager executing in memory by a processor of a general purpose computing system, the policy manager being coupled to at least two different Web conferencing platforms over a computer communications network,
said policy manager comprising a set of computer program instructions that when executed by the processor receive a Web conference request, pose to a communicatively linked end user sending the Web conference request,
a set of questions, the set of questions representing selection criteria for determining a platform for hosting a Web conference, the selection criteria includes a number of participants to the Web conference, whether the participants are internal or external to a private network of the end user,
a set of features desired for use during the Web conference,
a security level required for the Web conference, and a priority of the Web conference, receive answers to the posed set of questions,
retrieve one or more policies, each of the one or more policies specifying an appropriate platform selection based upon the answers received to the posed set of questions representing selection criteria,
process both the retrieved one or more policies and also the received answers to the set of questions to identify the platform for hosting the Web conference,
re-establish said selection criteria and process said retrieved one or more policies and also
said re-established selection criteria to identify different platform for hosting said Web conference.

2. The system of claim 1, wherein said at least two different Web conferencing platforms comprise a platform selected from the group consisting of a customer premises equipment based platform and a hosted platform.

3. The system of claim 1, further comprising a firewall disposed between said communicatively linked end user and said policy manager.

4. The system of claim 1, further comprising a demilitarized zone firewall disposed in between said policy manager and one or more end users coupled to said policy manager of a public Internet.

5. The system of claim 1, wherein said set of features comprises at least one feature selected from the group consisting of screen sharing, slideshow presentations, streaming audio, voice over IP, audio conferencing, the use of on-premise audio equipment, audio recording, joint Web browsing, chat and instant messaging and streaming video.

6. A policy based Web conference provisioning method comprising the steps of:
receiving a Web conference request;
posing to an end user sending the Web conference request, a set of questions, the set of questions representing selection criteria for determining a platform for hosting a Web conference, the selection criteria includes a number of participants to the Web conference, whether the participants are internal or external to a private network of the end user, a set of features desired for use during the Web conference, a security level required for the Web conference, and a priority of the Web conference;
receiving answers to the posed set of questions;
retrieving one or more policies, each of the one or more policies specifying an appropriate platform selection based upon the answers received to the posed set of questions representing selection criteria;
processing both the retrieved one or more policies and also the received answers to the set of questions, by a policy manager executing in memory by a processor of a general purpose computing system, to identify the platform for hosting the Web conference;
re-establishing said selection criteria; and, processing said retrieved one or more policies and also said re-established selection criteria to identify a different platform for hosting said Web conference.

7. The method of claim 6, further comprising the steps of:
resolving an address to said identified platform;
imbedding said address in an invitation to participate in said Web conference; and,
forwarding said invitation to selected participants in said Web conference.

8. The method of claim 6, further comprising the step of assigning the identified platform for hosting the Web conference when the Web conference is scheduled.

9. The method of claim 6, further comprising the step of assigning the identified platform for hosting the Web conference when the Web conference is initiated.

10. A machine readable device having stored thereon a computer program for policy based Web conference provisioning, the computer program comprising a routine set of instructions which when executed by a machine causes the machine to perform the steps of:
receiving a Web conference request;
posing to an end user sending the Web conference request, a set of questions, the set of questions representing selection criteria for determining a platform for hosting a Web conference,
  the selection criteria includes a number of participants to the Web conference,
  whether the participants are internal or external to a private network of the end user,
  a set of features desired for use during the Web conference,
  a security level required for the Web conference, and
  a priority of the Web conference;
receiving answers to the posed set of questions;
retrieving one or more policies, each of the one or more policies specifying an appropriate platform selection based upon the answers;
received to the posed set of questions representing selection criteria; processing both the retrieved one or more policies and also the received answers to the set of questions the policy to identify the platform for hosting the Web conference
re-establishing said selection criteria; and,
processing said retrieved one or more policies and
also said re-established selection criteria to identify a different platform for hosting said Web conference.

11. The machine readable device of claim 10, further comprising the steps of:
resolving an address to said identified platform;
imbedding said address in an invitation to participate in said Web conference; and,
forwarding said invitation to selected participants in said Web conference.

12. The machine readable device of claim 10, further comprising the step of assigning the identified platform for hosting the Web conference when the Web conference is scheduled.

13. The machine readable device of claim 10, further comprising the step of assigning the identified platform for hosting the Web conference when the Web conference is initiated.

* * * * *